US008902299B2

(12) United States Patent
Tsai et al.

(10) Patent No.: US 8,902,299 B2
(45) Date of Patent: Dec. 2, 2014

(54) ELECTRONIC DEVICE AND METHOD FOR AUTOMATICALLY ADJUSTING VIEWING ANGLE OF 3D IMAGES

(75) Inventors: Chih-Ching Tsai, New Taipei (TW); Mei-Ling Lin, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 461 days.

(21) Appl. No.: 13/316,464

(22) Filed: Dec. 10, 2011

(65) Prior Publication Data

US 2012/0236118 A1    Sep. 20, 2012

(30) Foreign Application Priority Data

Mar. 17, 2011    (TW) .............................. 100109158 A

(51) Int. Cl.
*H04N 13/04* (2006.01)
*H04N 13/00* (2006.01)
*H04N 9/80* (2006.01)
*G06F 3/01* (2006.01)
*G06F 3/0481* (2013.01)
*G09G 3/00* (2006.01)

(52) U.S. Cl.
CPC ..... *H04N 13/0477* (2013.01); *G09G 2320/028* (2013.01); *G09G 2320/0261* (2013.01); *G06F 3/011* (2013.01); *G06F 3/04815* (2013.01); *G09G 3/003* (2013.01)
USPC ................................ 348/51; 348/42; 386/239

(58) Field of Classification Search
None
See application file for complete search history.

(56) References Cited

U.S. PATENT DOCUMENTS

| 2004/0008251 A1* | 1/2004 | Mashitani et al. .............. 348/51 |
| 2012/0027257 A1* | 2/2012 | Lee et al. ...................... 382/103 |
| 2012/0038663 A1* | 2/2012 | Gustafsson et al. .......... 345/629 |
| 2012/0092466 A1* | 4/2012 | Choi ............................... 348/51 |

\* cited by examiner

*Primary Examiner* — Hung Dang
(74) *Attorney, Agent, or Firm* — Novak Druce Connolly Bove + Quigg LLP

(57) ABSTRACT

In a method for adjusting a viewing angle of 3D images using an electronic device, the electronic device includes a distance sensor, a camera lens and a 3D display screen. The distance sensor senses a distance between a viewer and the 3D display screen, and the camera lens to capture a digital image of the viewer. The method calculates a viewing angle of the viewer according to the distance and a displacement between the viewer and the 3D display screen, and calculates an angle difference between the viewing angle of the viewer and a viewing angle range of the 3D display screen. The method further adjusts a viewing angle of a 3D image according to the angle difference, and displays the 3D image on the 3D display screen according to the viewing angle of the 3D image.

19 Claims, 3 Drawing Sheets

ELECTRONIC DEVICE AND METHOD FOR AUTOMATICALLY ADJUSTING VIEWING ANGLE OF 3D IMAGES

BACKGROUND

1. Technical Field

The embodiments of the present disclosure relate to 3D images displaying devices and methods, and more particularly to an electronic device and method for automatically adjusting a viewing angle of a 3D image using the electronic device.

2. Description of Related Art 3D images may seem poorly saturated, poor contrast, blurry, or too faint outside a viewing angle range of a display screen. For example, the display screen may reflect more light perpendicular to the display screen and less light to the sides of the display screen, making the display screen appear much darker (and sometimes have distorted colors) if the viewer is not in front of the display screen. Many manufacturers of display screens define a viewing angle of acceptable viewing conditions, and thus requiring the manufacturers to specify maximum usable viewing angles in horizontal and vertical directions. Usually the display screens are aligned and used to facilitate a greater viewing angle in horizontal level, and a smaller angle in the vertical level, thus the 3D images displayed on the display screen may not be viewed completely. Therefore, it is desirable to have a method for automatically adjusting viewing angle of 3D images, so as to overcome the above-mentioned problems.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
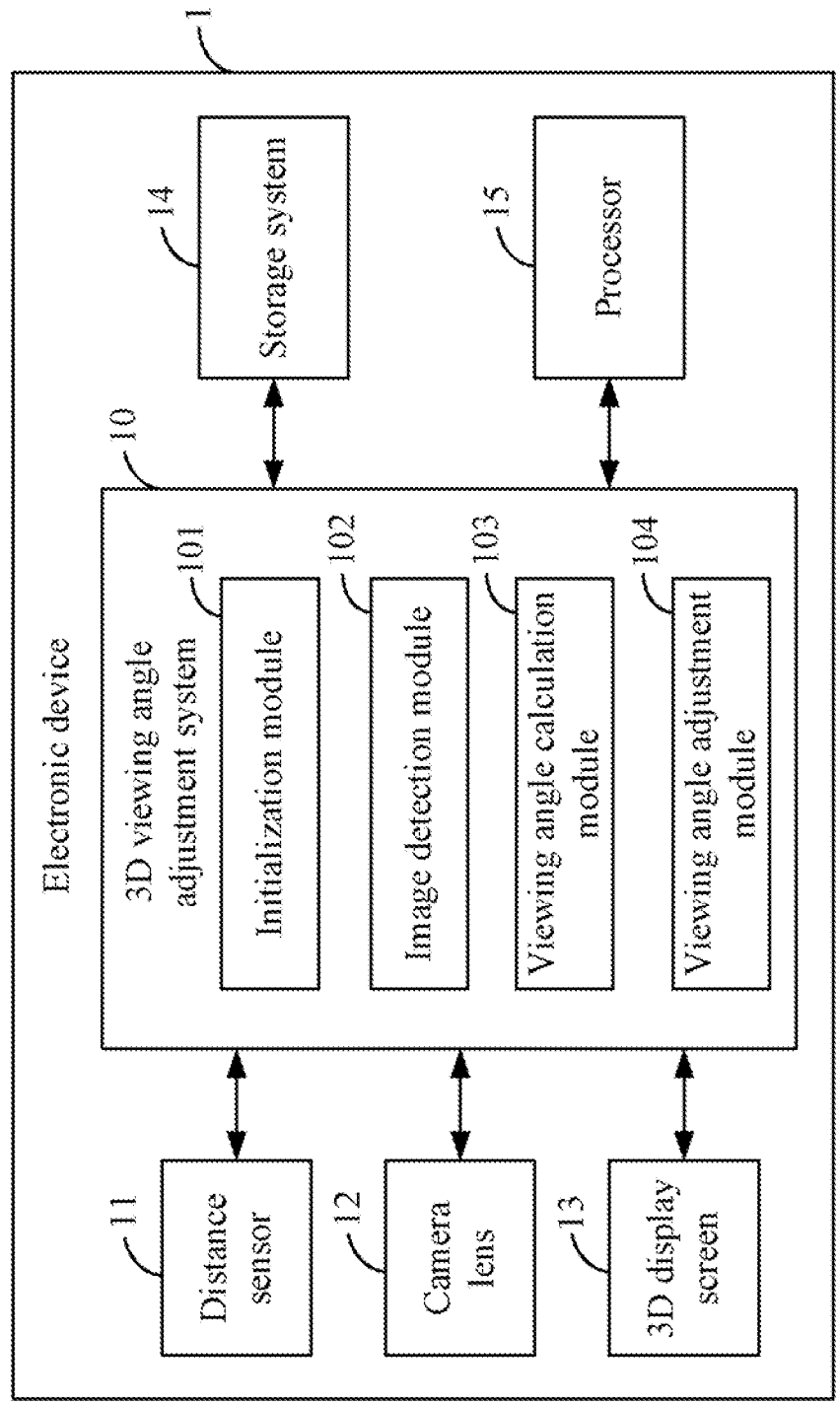
FIG. 1 is a block diagram of one embodiment of an electronic device including a 3D viewing angle adjustment system.

FIG. 1 is a block diagram of one embodiment of an electronic device 1 including a 3D viewing angle adjustment system 10. In the embodiment, the electronic device 1 may be a computer, a notebook, a personal digital assistant (PDA) device, or other computing devices having a 3D image display functionality. The camera device 1 may further include a distance sensor 11, a camera lens 12, a 3D display screen 13, a storage system 14, and at least one processor 15. Each of the components can communicate with the 3D viewing angle adjustment system 10 included in the electronic device 1. It is understood that FIG. 1 is only one example of the electronic device 1 that includes more or fewer components than those shown in the embodiment, or have a different configuration of the various components.

The 3D viewing angle adjustment system 10 may include a plurality of functional modules that are implemented by the electronic device 1 to automatically adjust a viewing angle of 3D images to be displayed on the 3D display screen 13, so as to adapt to a viewing angle of the viewer in front of the 3D display screen 13. It is understood that the viewing angle is the maximum angle at which the 3D display screen 13 can be viewed by a viewer with acceptable visual performance.

The distance sensor 11 is an optical sensor that can sense a distance between the viewer (e.g., a head or a body of the viewer) and the 3D display screen 13. The camera lens 12 is an optical lens which can capture digital images of a subject, such as the viewer of the embodiment. The 3D display screen 13 is operable to display 3D images to the viewer based on different viewing angles of the viewer. In one embodiment, the storage system 14 may be an internal storage system, such as a random access memory (RAM) for the temporary storage of information, and/or a read only memory (ROM) for the permanent storage of information. In some embodiments, the storage system 14 may also be an external storage system, such as an external hard disk, a storage card, or a data storage medium. The processor 15 may be a central processing unit or a micro control unit, for example.

The storage system 14 stores a predefined face feature value, and a predefined eyes feature value. In the embodiment, the face feature value may be a face similarity coefficient (e.g., a 80% similarity) that represents a part of the digital image which is most likely to contain to contain a face of a person, and the eyes feature value may be an eyes similarity coefficient (e.g., a 90% similarity) that represents a part of the digital image which is most likely to contain eyes of the person.

In one embodiment, the 3D viewing angle adjustment system 10 includes an initialization module 101, an image detection module 102, a viewing angle calculation module 103, and a viewing angle adjustment module 104. The modules 101-104 may comprise computerized instructions in the form of one or more programs that are stored in the storage system 14 and executed by the processor 15 to provide functions for implementing the modules. In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives. A detailed descriptions of each module will be given in FIG. 2 as described in the following paragraphs.

Figure 2:
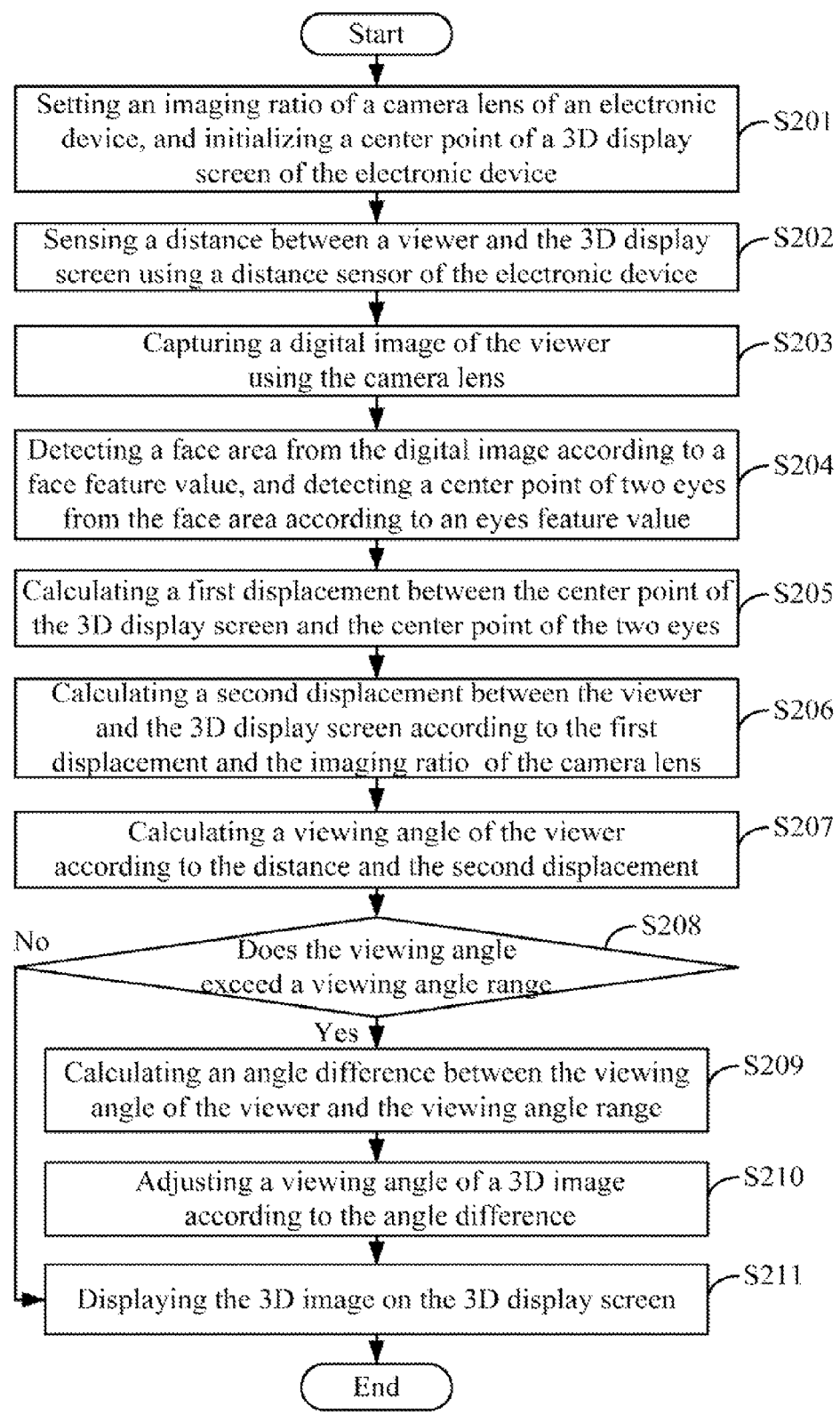
FIG. 2 is a flowchart of one embodiment of a method for automatically adjusting a viewing angle of 3D images using the electronic device of FIG. 1.

FIG. 2 is a flowchart of one embodiment of a method for automatically adjusting a viewing angle of 3D images using the electronic device 1 of FIG. 1. In one embodiment, the method can automatically adjust a viewing angle of a 3D image to be displayed on the 3D display screen 13, so as to adapt to a viewing angle of the viewer positioned in front of the 3D display screen 13. Depending on the embodiment, additional blocks may be added, others removed, and the ordering of the blocks may be changed.

In block S201, the initialization module 101 sets an imaging ratio of the camera lens 12, and initializes a center point of the 3D display screen 13. When the viewer starts a 3D image display function of the electronic device 1, the initialization module 101 may initialize the distance sensor 11 to invoke a distance sensing function, and the camera lens 12 to invoke an image capturing function. In one embodiment, the imaging ratio may be set as 50:1 for the viewer and a digital image of the viewer captured by the camera lens 12. The initialization module 101 may initialize the coordinates of the center point of the 3D display screen 13. In one example with respect to FIG. 3, the point "O" is regards as the center point of the 3D display screen 13, and the coordinates of the center point "O" may be initialize as (0, 0).

Figure 3:
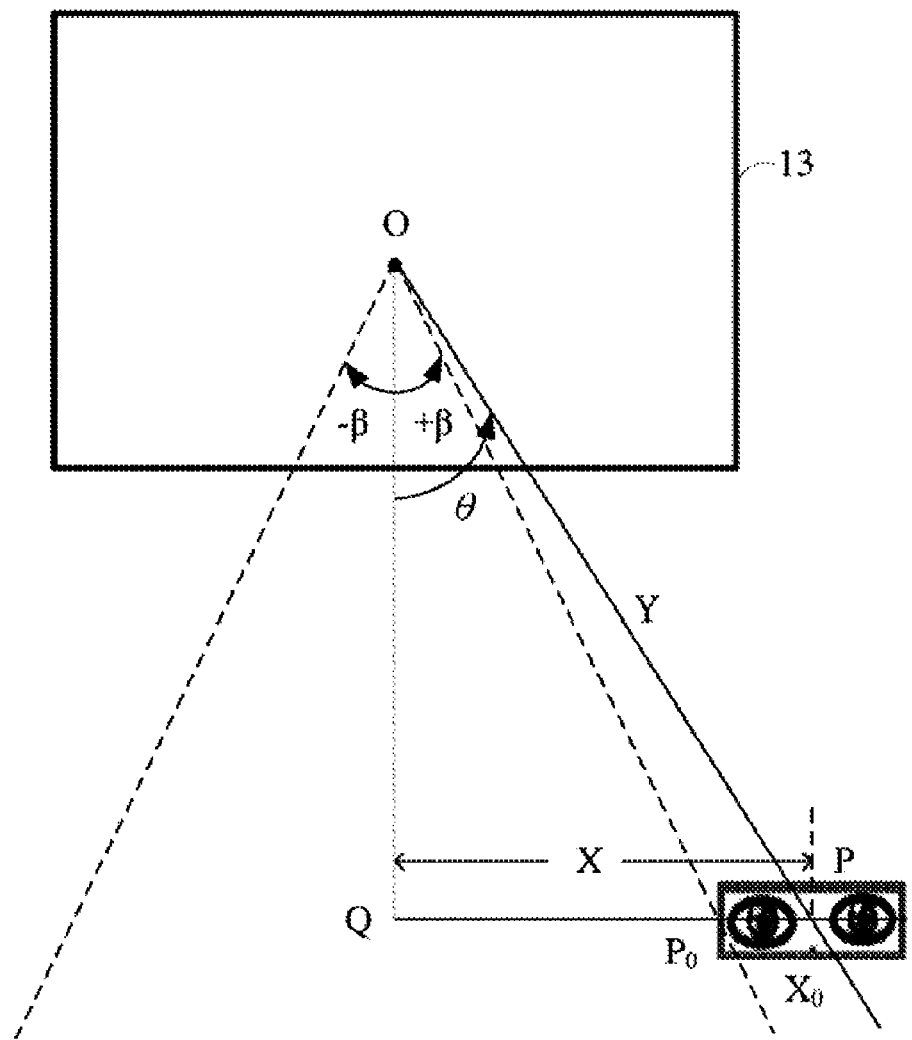
FIG. 3 is a schematic diagram illustrating an example of adjusting a viewing angle of a 3D image to be displayed on a 3D display screen of the electronic device.

In block S202, the image detection module 102 controls the distance sensor 11 to sense a distance between the viewer and the 3D display screen 13. Referring to FIG. 3, the line segment "OP" is sensed as the distance between the viewer and the 3D display screen 13, and the distance may be represented by "Y". In block 5203, the image detection module 102 controls the camera lens 12 to capture a digital image of the viewer.

In block S204, the image detection module 102 detects a face area (i.e., an area of a face of the viewer) from the digital image of the viewer according to a face feature value, and detects a center point of two eyes from the face area according to an eyes feature value. As mentioned above, the face feature value may be predefined as a face similarity coefficient (e.g., a 80% similarity), and is stored in the storage system 14. The eyes feature value may be predefined as an eyes similarity coefficient (e.g., a 90% similarity), and is stored in the storage system 14. In one example with respect to FIG. 3, the point "P" may be regards as the center point of the two eyes.

In block S205, the viewing angle calculation module 103 calculates a first displacement between the center point "O" of the 3D display screen 13 and the center point "P" of the two eyes. Referring to FIG. 3, the first displacement "$PP_0$" is a relative distance between the center point "O" and the center point "$P_0$" in horizontal level, and may be represented by "$X_0$".

In block S206, the viewing angle calculation module 103 calculates a second displacement between the viewer and the 3D display screen 13 according to the first displacement and the imaging ratio of the camera lens 12. Referring to FIG. 3, the second displacement "QP" is an actual distance between the viewer and the 3D display screen 13 in horizontal level, and may be represented by "X".

In block S207, the viewing angle calculation module 103 calculates a viewing angle "θ" of the viewer according to the distance "Y" and the second displacement "X". In one embodiment, the viewing angle of the viewer is calculated by a formula: $\theta = \text{Arcsin}(X/Y)$, where "θ" is the viewing angle as shown in FIG. 3, and "Arcsin" is an inverse trigonometric function.

In block S208, the viewing angle adjustment module 104 determines whether the viewing angle of the viewer exceeds a viewing angle range of the 3D display screen 13. In one embodiment, the viewing angle range may be predefined by a manufacturer of the 3D display screen 13. Referring to FIG. 3, the viewing angle rang may be predefined as an angle range "β" between −15 degrees and +15 degrees, i.e., represented by [−15°, +15°]. If the viewing angle of the viewer exceeds the viewing angle range, block S209 is implemented. Otherwise, if the viewing angle of the viewer does not exceed the viewing angle range, block S211 is implemented.

In block S209, the viewing angle adjustment module 104 calculates an angle difference between the viewing angle of the viewer and the viewing angle range. In block S210, the viewing angle adjustment module 104 automatically adjusts a viewing angle of a 3D image to be displayed on the 3D display screen 13 according to the angle difference. In block S211, the viewing angle adjustment module 104 displays the 3D image on the 3D display screen 13 according to the viewing angle of the 3D image.

All of the processes described above may be embodied in, and fully automated via, functional code modules executed by one or more general purpose processors of electronic devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   a distance sensor, a camera lens, and a 3D display screen;
   a storage system, and at least one processor; and
   one or more programs stored in the storage system and executed by the at least one processor, the one or more programs comprising:
   an initialization module that sets an imaging ratio of the camera lens, and initializes a center point of the 3D display screen;
   an image detection module that controls the distance sensor to sense a distance between a viewer and the 3D display screen, controls the camera lens to capture a digital image of the viewer, and detects a center point of two eyes of the viewer from the digital image;
   a viewing angle calculation module that calculates a first displacement between the center point of the 3D display screen and the center point of the two eyes, calculates a second displacement between the viewer and the 3D display screen according to the first displacement and the imaging ratio of the camera lens, and calculates a viewing angle of the viewer according to the distance and the second displacement; and
   a viewing angle adjustment module that determines whether the viewing angle of the viewer exceeds a viewing angle range of the 3D display screen, calculates an angle difference between the viewing angle of the viewer and the viewing angle range when the viewing angle of the viewer exceeds the viewing angle range, adjusts a viewing angle of a 3D image to be displayed on the 3D display screen according to the angle difference, and displays the 3D image on the 3D display screen according to the viewing angle of the 3D image.

2. The electronic device according to claim 1, wherein the image detection module detects the center point of the two eyes from the digital image by steps of:
   detecting a face area from the digital image according to a face feature value; and
   detecting the center point of the two eyes from the face area according to an eyes feature value.

3. The electronic device according to claim 2, wherein the face feature value is a face similarity coefficient that represents a part of the digital image which is most likely to contain a face of a person, and is stored in the storage system.

4. The electronic device according to claim 2, wherein the eyes feature value is an eye similarity coefficient that represents a part of the digital image which is most likely to contain eyes of the person, and is stored in the storage system.

5. The electronic device according to claim 1, wherein the viewing angle adjustment module operable to displays the 3D image on the 3D display screen when the viewing angle of the viewer does not exceed the viewing angle range.

6. The electronic device according to claim 1, wherein the first displacement is a relative distance between the center point of the 3D display screen and the center point of the two eyes in horizontal level, and the second displacement is an actual distance between the viewer and the 3D display screen in horizontal level.

7. A method for adjusting a viewing angle of 3D images using an electronic device, the electronic device comprising a distance sensor, a camera lens and a 3D display screen, the method comprising:
   setting an imaging ratio of the camera lens, and initializing a center point of the 3D display screen;
   controlling the distance sensor to sense a distance between a viewer and the 3D display screen, and controlling the camera lens to capture a digital image of the viewer;
   detecting a center point of two eyes of the viewer from the digital image;
   calculating a first displacement between the center point of the 3D display screen and the center point of the two eyes;
   calculating a second displacement between the viewer and the 3D display screen according to the first displacement and the imaging ratio of the camera lens;
   calculating a viewing angle of the viewer according to the distance and the second displacement;
   determining whether the viewing angle of the viewer exceeds a viewing angle range of the 3D display screen; and
   upon the condition that the viewing angle of the viewer exceeds the viewing angle range, calculating an angle difference between the viewing angle of the viewer and the viewing angle range, adjusting a viewing angle of a 3D image to be displayed on the 3D display screen according to the angle difference, and displaying the 3D image on the 3D display screen according to the viewing angle of the 3D image.

8. The method according to claim 7, wherein the center point of the two eyes is detected from the digital image by steps of:
   detecting a face area from the digital image according to a face feature value; and
   detecting the center point of the two eyes from the face area according to an eyes feature value.

9. The method according to claim 8, wherein the face feature value is a face similarity coefficient that represents a part of the digital image which is most likely to contain a face of a person, and is stored in the storage system of the electronic device.

10. The method according to claim 8, wherein the eyes feature value is an eye similarity coefficient that represents a part of the digital image which is most likely to contain eyes of the person, and is stored in the storage system of the electronic device.

11. The method according to claim 7, further comprising:
   displaying the 3D image on the 3D display screen upon the condition that the viewing angle of the viewer does not exceed the viewing angle range.

12. The method according to claim 7, wherein the first displacement is a relative distance between the center point of the 3D display screen and the center point of the two eyes in horizontal level, and the second displacement is an actual distance between the viewer and the 3D display screen in horizontal level.

13. A non-transitory storage medium having stored thereon instructions that, when is executed by at least one processor of an electronic device, causes the electronic device to perform a method for adjusting a viewing angle of 3D images, the electronic device comprising a distance sensor, a camera lens and a 3D display screen, the method comprising:
   setting an imaging ratio of the camera lens, and initializing a center point of the 3D display screen;
   controlling the distance sensor to sense a distance between a viewer and the 3D display screen, and controlling the camera lens to capture a digital image of the viewer;
   detecting a center point of two eyes of the viewer from the digital image;
   calculating a first displacement between the center point of the 3D display screen and the center point of the two eyes;
   calculating a second displacement between the viewer and the 3D display screen according to the first displacement and the imaging ratio of the camera lens;
   calculating a viewing angle of the viewer according to the distance and the second displacement;
   determining whether the viewing angle of the viewer exceeds a viewing angle range of the 3D display screen; and
   upon the condition that the viewing angle of the viewer exceeds the viewing angle range, calculating an angle difference between the viewing angle of the viewer and the viewing angle range, adjusting a viewing angle of a 3D image to be displayed on the 3D display screen according to the angle difference, and displaying the 3D image on the 3D display screen according to the viewing angle of the 3D image.

14. The storage medium according to claim 13, wherein the center point of the two eyes is detected from the digital image by steps of:
   detecting a face area from the digital image according to a face feature value; and
   detecting the center point of the two eyes from the face area according to an eyes feature value.

15. The storage medium according to claim 14, wherein the face feature value is a face similarity coefficient that represents a part of the digital image which is most likely to contain a face of a person, and is stored in the storage system of the electronic device.

16. The storage medium according to claim 14, wherein the eyes feature value is an eye similarity coefficient that represents a part of the digital image which is most likely to contain eyes of the person, and is stored in the storage system of the electronic device.

17. The storage medium according to claim 13, wherein the method further comprises:
   displaying the 3D image on the 3D display screen upon the condition that the viewing angle of the viewer does not exceed the viewing angle range.

18. The storage medium according to claim 13, wherein the first displacement is a relative distance between the center point of the 3D display screen and the center point of the two eyes in horizontal level, and the second displacement is an actual distance between the viewer and the 3D display screen in horizontal level.

19. The storage medium according to claim 13, wherein the storage medium is selected from the group consisting of a hard disk drive, a compact disc, a digital video disc, and a tape drive.

* * * * *